Oct. 27, 1953     M. J. MULHERN ET AL     2,657,337
ELECTRIC VALVE EXCITATION AND CONTROL CIRCUIT
Filed July 24, 1952
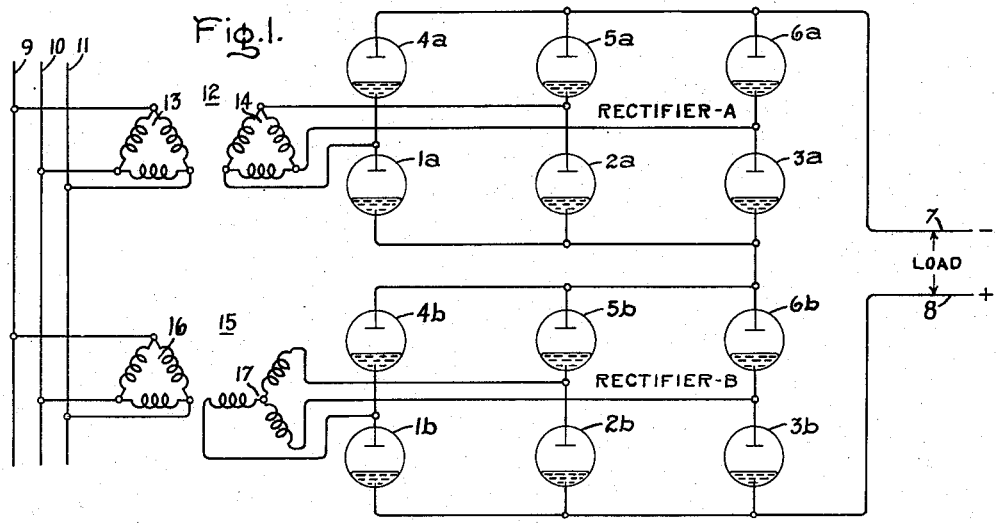
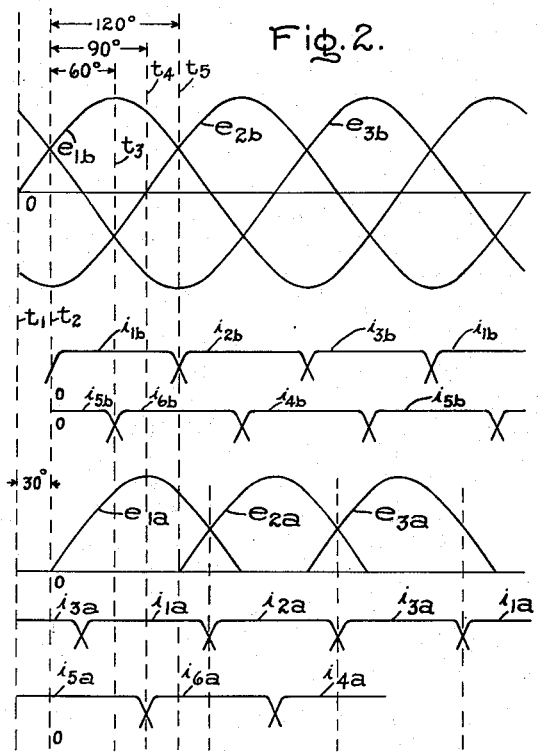
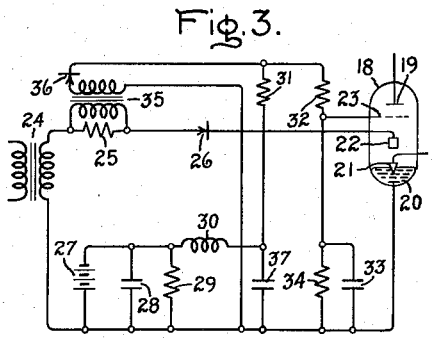
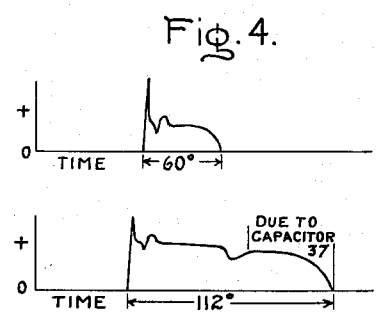
Inventors:
Marvin J. Mulhern,
Charles E. Rettig,
by  Their Attorney.

Patented Oct. 27, 1953

2,657,337

UNITED STATES PATENT OFFICE 2,657,337

ELECTRIC VALVE EXCITATION AND CONTROL CIRCUIT

Marvin J. Mulhern and Charles E. Rettig, Schenectady, N. Y., assignors to General Electric Company, a corporation of New York Application July 24, 1952, Serial No. 300,784

3 Claims. (Cl. 315—262)

This invention relates to electric valve excitation and control circuits and more particularly to excitation and control circuits for electric valves of the ionizable medium or ignitron type which are provided with an immersion ignitor having in addition a grid or analogous electrode to effect accurate starting and rapid deionization. Specifically, this invention relates to an improved means whereby the positive signal supplied to the grid of an electric valve of the ignitron type is prolonged for a substantial period of time.

In an arrangement where one double way or full wave rectifier, including six electric valves of the ignitron type, is arranged so that the direct current output circuit thereof is connected in series with the direct current output of another full wave or double way rectifier, it becomes necessary to prolong the grid excitation of each of the twelve valves so that proper commutation of the currents can take place. Ordinarily, excitation circuits for energizing the grids of ignitrons do not maintain excitation for a sufficiently long time to permit the use of two double way rectifiers arranged with their direct current circuits in series. The term full wave or double way rectifier is used to mean a rectifier which operates during both positive and negative half cycles.

A principal object of this invention is to provide means for increasing the duration of time during which the grids of ignitron valves are maintained positive so as to make possible the connection and use of two or more double way rectifiers in series.

According to the invention the grid excitation circuit for each valve of a plurality of double way or full wave rectifier units connected in series is provided with a tuned circuit which is arranged so as to resonate in such a way that positive energization of the grid of each valve is substantially prolonged. Such a tuned circuit in one form may be connected across an inductive coupling device which interrelates the excitation circuit for the grid of each ignitron with a circuit for energizing an auxiliary or holding anode commonly used to maintain a cathode spot established within each ignitron.

The invention will be better understood by reference to the following description taken in conjunction with the accompanying drawing in which Fig. 1 is a schematic representation of two series-connected double way rectifiers to which the invention is applicable, Fig. 2 is a family of curves to aid in understanding the invention as being applicable to an arrangement such as is shown in Fig. 1, Fig. 3 is a schematic representation of an excitation and control circuit for an electric valve of the ignitron type which incorporates the invention, and Fig. 4 is a family of curves for depicting the effect on the wave shape of voltage supplied to the control grids of each of the valves caused by the invention.

With reference to Fig. 1, a double way rectifier designated by the letter A is shown with its direct current output circuit connected in series with another double way rectifier designated by the letter B. The numerals 1–6 respectively designate the six valves comprising each of the rectifiers, the subscript letter "$a$" being used in conjunction with the valves 1–6 of rectifier A and the subscript "$b$" being used in conjunction with each of the numerals 1–6 which respectively designate the valves comprising rectifier B. The direct current output circuit of the two double way rectifiers is designated by the numeral 7 for the negative terminal and the numeral 8 for the positive terminal. Three-phase alternating current energy is supplied to the two double way rectifiers from the three-phase circuit comprising conductors 9, 10 and 11. Rectifier A is energized from the conductors 9, 10 and 11 through the transformer 12 having a mesh-connected primary winding 13 and a mesh-connected secondary winding 14. Rectifier B is energized from the three-phase alternating current circuit comprising conductors 9, 10 and 11 through the transformer 15 having a mesh-connected primary winding 16 and a star-connected secondary winding 17.

The voltage output of the secondary winding 17 of transformer 15 is displaced in phase from the voltage output of the secondary winding 14 of transformer 12 by 30° due to the fact that the winding 17 is star-connected and the winding 14 is mesh-connected. This fact is represented graphically in Fig. 2. The voltage $e_{1b}$ represents the output voltage to rectifier B from one phase of transformer 15 while the voltage wave $e_{1a}$ represents the voltage output of the secondary winding 14 of transformer 12 which is displaced from the voltage $e_{1b}$ by the time between the time indicated at $t_1$ and that indicated 30 electrical degrees later at the time $t_2$.

At the time designated $t_3$ which represents a conducting period of 60 electrical degrees for valve 1 of rectifier B, the current in valve 1 as indicated by the current curve $i_{1b}$ is at a maximum value. At this instant $t_3$, the current is commutating between valve 5 to valve 6 of rectifier B as indicated by the curves $i_{5b}$ and $i_{6b}$. Stated otherwise at the time designated $t_3$, the valve 1 of rectifier is in series with the valves 5 and 6 of rectifier B. Since rectifier A lags rectifier B by 30 electrical degrees, commutation from valve 5a to valve 6a occurs 30 electrical degrees after current is commutated from valve 5b to 6b as indicated between $t_3$ and $t_4$. Thus having turned valve 1b on at time $t_2$, its grid excitation should be maintained at least to some time after $t_4$, such as $t_5$ when commutation from tube 5b to tube 6b and from tube 5a to tube 6a is completed. Ordinary grid control circuits do not maintain excitation for such a long period of time which, as indicated in Fig. 2, is in excess of 90°. Preferably, this time should approach 120° as indicated between $t_2$ and $t_5$. Thus according to this invention, excitation of each of the valves is prolonged from the present 60° to some time approaching 120°.

The circuit whereby excitation of a control grid is prolonged is shown in Fig. 3. In Fig. 3 an ignitron 18 is shown provided with an anode 19, a mercury pool cathode 20 having immersed therein an ignitor 21 and having an auxiliary or holding anode 22 as well as a control grid 23. For purposes of simplicity, the energizing circuit for ignitor 21 has been omitted from the drawings. Such a circuit could comprise an arrangement such as is disclosed in Patent 2,484,565 to Herskind and Mulhern, granted October 11, 1949, and assigned to the assignee of this invention. Furthermore, it will be understood that the valve 18 represents any one of the valves 1-6 of the rectifiers A and B of Fig. 1 and that each of the valves of Fig. 1 is provided with a circuit such as is shown in Fig. 3.

Once a cathode spot has been established at the cathode 20 of a particular valve as by the supplying of a high peak wave of energy to the ignitor 21, such a cathode spot is maintained by the action of a holding or auxiliary anode 22. Holding anode 22 is energized from an alternating current source such as is designated by the transformer 24 through resistance 25 and a unidirectional conducting device 26, one terminal of the secondary winding of transformer 24 being connected to the cathode 20 of ignitron 18. Thus the cathode spot is maintained due to the action of the auxiliary anode 22, as is well understood and as is explained in the above-mentioned patent.

The control grid 23 is supplied with negative bias from a direct current source schematically represented by the battery 27, across which is connected a smoothing capacitor 28 and a bias resistor 29. The upper terminal of bias resistor 29 is connected through linear reactor 30, a resistor 31 and a resistor 32 to the grid 23. Capacitor 33 is connected between the control grid 23 and the cathode 20 to provide a low impedance path to the cathode for transient voltages which might appear at the grid due to inductive or electrostatic effects. A resistor 34 is connected in parallel with the capacitor 33 to prevent the build-up of excessive voltages at the grid due to high currents which could flow during faulty conditions. The resistor 32 serves to limit grid current during conduction of valve 18 and also prevents excessive ion current flow in the reverse direction during the period immediately after the main anode 19 ceases conducting.

The grid 23 is rendered positive due to conduction of current through resistor 25 to holding anode 22 due to the action of transformer 35 whose primary is connected across resistor 25 and whose secondary is connected between the cathode 20 and control grid 23 through rectifier 36. Thus the tube cannot be turned on until a cathode spot is established.

With the circuit constructed substantially as described thus far, the grid 23 is maintained at a positive potential for approximately 60° as indicated in the top curve of Fig. 4. For operating two double way rectifiers in series, it is necessary to extend the time of positive energization of the grid as is indicated in the lower portion of the Fig. 4 to some value of time approaching 120°, such as 112° as already explained. Such an increase in the time of energization of grid 23 is accomplished in accordance with the invention by the addition of a capacitor 37 to the circuit of Fig. 3 and by constructing this capacitor in such a way that a resonant circuit is established which comprises the permissive transformer 35 and the capacitor 37.

Preferably, the resonant frequency of the capacitor 37 and the transformer 35 is adjusted in such a way that the capacitor voltage reaches its positive crest value at the time when the voltage of transformer 35 has decreased to equal the value of arc drop voltage between cathode 20 and control grid 23. In this way, the voltage wave, such as is indicated as being of 60 electrical degrees duration in Fig. 4, is extended to some value such as 112 electrical degrees as indicated in Fig. 4.

By this means it will be understood that each of the valves such as 1-6 of each of the rectifiers such as A and B of Fig. 1 can be maintained conductive for a period of time substantially longer than formerly thereby to enable series operation of the output circuits of two double way series-connected rectifiers.

While we have described and shown a particular embodiment of our invention, we do not wish to be limited thereto and intend in the appended claims to cover all such changes and modifications as fall within the true spirit and scope of our invention.

What we claim as new and desire to secure by Letters Patent of the United States is:

1. In combination, an electric discharge device of the type employing an enclosing envelope and comprising therein an ionizable medium, an anode, a cathode and a control electrode, means for initiating electron emission at said cathode, an auxiliary electrode within said envelope, an energizing circuit connected to said auxiliary electrode for establishing a path for electron emission from said cathode to said auxiliary electrode, an energizing circuit connected to said control electrode, means responsive to current flow in said auxiliary electrode circuit for producing a voltage variable in accordance with such current flow, inductive coupling means interconnecting said auxiliary electrode circuit and the energizing circuit of said control electrode for impressing a voltage derived from said second-mentioned means upon said control electrode in response to current flow in said auxiliary electrode circuit, and means including a capacitor connected across said inductive coupling means and forming therewith a tuned circuit, the voltage wave of which is timed and shaped so as to prolong the period of energization of said control electrode.

2. In combination, an electric discharge device of the type employing an enclosing envelope and comprising therein an ionizable medium, an anode, a cathode and a control electrode, means for initiating electron emission at said cathode, an auxiliary electrode within said envelope, an energizing circuit connected to said auxiliary electrode for establishing a path for electron emission from said cathode to said auxiliary electrode, an energizing circuit connected to said control electrode, means responsive to current flow in said auxiliary electrode circuit for producing a voltage variable in accordance with such current flow, inductive coupling means interconnecting said auxiliary electrode circuit and the energizing circuit of said control electrode for impressing voltage derived from said second-mentioned means upon said control electrode in response to the flow of current in said auxiliary electrode circuit, and capacitance means and resistance means connected in series with respect to each other and in shunt with said inductive coupling means, said capacitance means and said inductive coupling means forming a tuned circuit, the resonant frequency of which is such that the voltage of said capacitance means reaches its positive crest value at substantially the same time that the voltage of said inductive coupling means decays to a value substantially equal to the arc drop voltage between said cathode and said control electrode.

3. In combination, an ignitron comprising an anode, a mercury pool cathode, a control grid, means for periodically establishing electron emission at said cathode to establish a cathode spot thereon, an auxiliary holding anode within said ignitron, a holding anode circuit including a source of voltage and a resistor connected in series relation with said holding anode, an energizing circuit connected to said grid, a transformer having a primary winding connected across said resistor and a secondary winding connected in series relation with said energizing circuit of said grid for coupling said holding anode circuit and said energizing circuit, and a circuit including a capacitor and a resistor connected in shunt with said secondary winding, said capacitor and said transformer being tuned so as to resonate in such a manner as to increase substantially the period of time during which said control grid is operably energized.

MARVIN J. MULHERN.
CHARLES E. RETTIG.

References Cited in the file of this patent
UNITED STATES PATENTS

| Number | Name | Date |
|---|---|---|
| 2,484,565 | Herskind et al. | Oct. 11, 1949 |